(12) United States Patent
Jones (10) Patent No.: US 9,695,628 B2
(45) Date of Patent: Jul. 4, 2017

(54) VACUUM INSULATED GLASS (VIG) WINDOW UNIT INCLUDING PUMP-OUT TUBE PROTECTION RING AND/OR CAP AND METHODS FOR MAKING SAME

(75) Inventor: Jeffrey A. Jones, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 1151 days.

(21) Appl. No.: 13/466,356

(22) Filed: May 8, 2012

(65) Prior Publication Data

US 2013/0302542 A1    Nov. 14, 2013

(51) Int. Cl.
*E06B 3/66* (2006.01)
*B32B 17/10* (2006.01)
*E06B 3/677* (2006.01)

(52) U.S. Cl.
CPC ........ *E06B 3/6612* (2013.01); *B32B 17/1055* (2013.01); *E06B 3/677* (2013.01); *Y02B 80/24* (2013.01)

(58) Field of Classification Search
CPC ....... E06B 3/6612; E06B 3/677; Y02B 80/24; B32B 17/1055
See application file for complete search history.

(56) References Cited

U.S. PATENT DOCUMENTS

| | | |
|---|---|---|
| 3,837,866 A | 9/1974 | Malmendier et al. |
| 4,256,495 A | 3/1981 | Kawamura et al. |
| 4,743,302 A | 5/1988 | Dumesnil et al. |
| 5,051,381 A | 9/1991 | Ohji et al. |
| 5,156,894 A | 10/1992 | Hood et al. |
| 5,308,662 A | 5/1994 | Woodard et al. |
| 5,534,469 A | 7/1996 | Hayashi |
| 5,657,607 A | 8/1997 | Collins et al. |
| 5,664,395 A | 9/1997 | Collins et al. |
| 5,784,853 A | 7/1998 | Hood et al. |
| 5,902,652 A | 5/1999 | Collins et al. |
| 5,964,630 A * | 10/1999 | Slusarczuk et al. ............ 445/25 |
| 6,014,872 A | 1/2000 | Hartig et al. |

(Continued)

FOREIGN PATENT DOCUMENTS

| | | |
|---|---|---|
| CN | 2 564 694 | 8/2003 |
| CN | 2 835 403 | 11/2006 |

(Continued)

OTHER PUBLICATIONS

U.S. Appl. No. 13/541,840, filed Jul. 5, 2012; Jones.

(Continued)

*Primary Examiner* — Donald J Loney
(74) *Attorney, Agent, or Firm* — Nixon & Vanderhye P.C.

(57) ABSTRACT

A vacuum insulated glass (VIG) assembly is provided with a protective ring surrounding a portion of a glass pump-out tube extending beyond an outer surface of one of the glass substrates that form the vacuum insulated glass assembly. The vacuum insulated glass assembly may further include a laminated glass substrate in which a hole is formed to accommodate the protective ring and/or pump-out tube portion, wherein the protective ring protects the glass pump-out tube from damage during a lamination process. In addition, a cap may be provided over the laminated substrate to cover the hole in the laminated substrate and further cover the protective ring and sealed pump-out tube.

28 Claims, 4 Drawing Sheets

(56) References Cited

U.S. PATENT DOCUMENTS

| | | |
|---|---|---|
| 6,632,491 B1 | 10/2003 | Thomsen et al. |
| 6,692,600 B2 | 2/2004 | Veerasamy et al. |
| 7,425,518 B2 | 9/2008 | Yoshida et al. |
| 7,851,034 B2 | 12/2010 | Cooper |
| 8,101,278 B2 | 1/2012 | Laird |
| 8,137,494 B2 | 3/2012 | Cooper et al. |
| 8,202,587 B2 | 6/2012 | Wang |
| 8,227,055 B2 | 7/2012 | Wang |
| 2005/0233885 A1 | 10/2005 | Yoshida et al. |
| 2006/0175767 A1* | 8/2006 | Collins ............... E06B 3/6612 277/644 |
| 2007/0148379 A1 | 6/2007 | Theios et al. |

FOREIGN PATENT DOCUMENTS

| | | |
|---|---|---|
| EP | 1 508 551 | 2/2005 |
| EP | 157134 A1 * | 9/2005 |
| JP | S61-029035 | 2/1986 |
| JP | H11-278877 | 10/1999 |
| JP | 2000 203892 | 7/2000 |
| JP | 2001-058852 | 6/2001 |
| JP | 2001-253724 | 9/2001 |

OTHER PUBLICATIONS

U.S. Appl. No. 13/484,597, filed May 31, 2012; Dennis et al.
International Search Report mailed Jul. 18, 2013.
CN Office Action issued Oct. 9, 2015 for CN Application No. 201380035472.4.

* cited by examiner

VACUUM INSULATED GLASS (VIG) WINDOW UNIT INCLUDING PUMP-OUT TUBE PROTECTION RING AND/OR CAP AND METHODS FOR MAKING SAME

CROSS-REFERENCE TO RELATED APPLICATIONS

This application is related to commonly-assigned co-pending U.S. Pat. application Ser. No. 13/246,980, entitled, "Vacuum Insulating Glass (VIG) Unit Pump-Out Tube Protecting Techniques, and/or VIG Units Incorporating the Same," filed Sep. 28, 2011, the disclosure of which is incorporated herein in its entirety.

TECHNICAL FIELD

This disclosure relates generally to vacuum insulated glass (VIG) unit configurations including a pump-out tube. The disclosure more particularly relates to a VIG unit configuration including a protective member, such as, for example, a ring, for protecting the pump-out tube from damage during various manufacturing processes, including, but not limited to processes in which a VIG unit may be provided with an additional laminated substrate. The disclosure also relates to a cap that may be provided on the additional laminated substrate and over the pump-out tube and protective ring. The disclosure further describes example methods for making a VIG unit including a protective member or ring for protecting a pump-out tube of a VIG unit from damage.

BACKGROUND AND SUMMARY OF EXAMPLE EMBODIMENTS

Vacuum insulating glass (VIG) units typically include at least two spaced apart glass substrates that enclose an evacuated or low-pressure space therebetween, The substrates are interconnected by a peripheral edge seal and typically include spacers between the glass substrates to maintain spacing between the glass substrates and to avoid collapse of the glass substrates that may be caused due to the low pressure environment that exists between the substrates. Some example VIG configurations are disclosed, for example, in U.S. Pat. Nos. 5,664,395, 5,657,607 and 5,902,652, the disclosures of which are all hereby incorporated by reference herein in their entireties.

Figure 1:
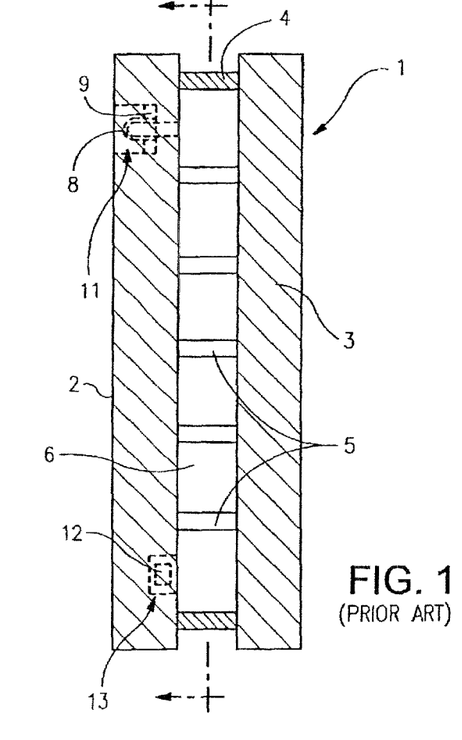
FIG. 1 is a cross sectional schematic diagram of a conventional VIG unit.
Figure 2:
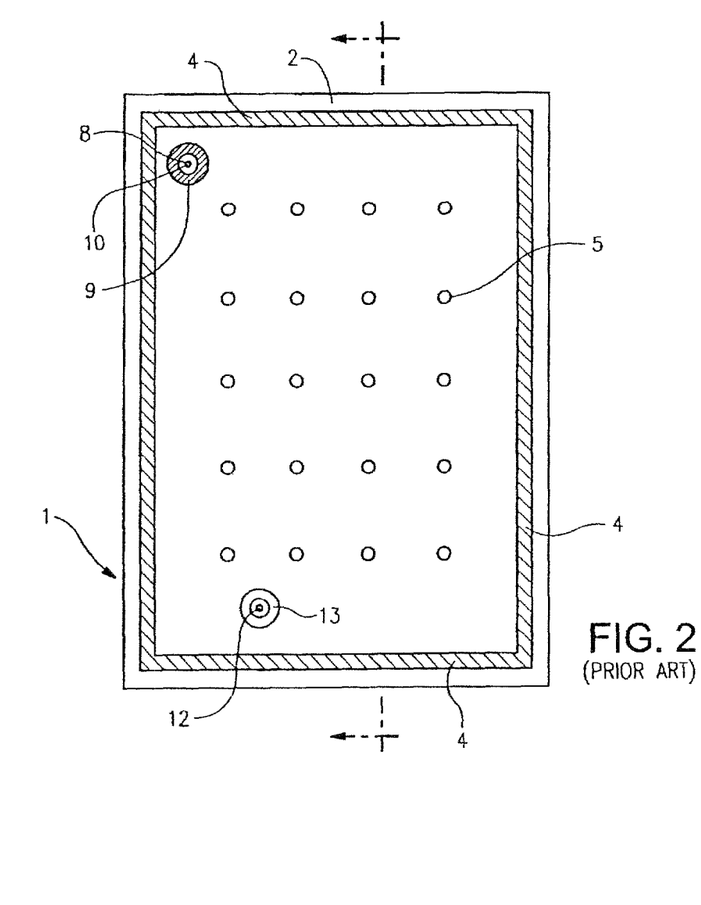
FIG. 2 is a top plan view of a conventional VIG unit.

FIGS. 1 and 2 illustrate a typical VIG unit 1 and elements that form the VIG unit 1. For example, VIG unit 1 may include two spaced apart glass substrates 2, 3, which enclose an evacuated or low-pressure space 6 therebetween. Glass sheets or substrates 2,3 are interconnected by a peripheral edge seal 4 which may be made of fused solder glass, for example. An array of support pillars/spacers 5 may be included between the glass substrates 2, 3 to maintain the spacing of substrates 2, 3 of the VIG unit 1 in view of the low-pressure space/gap present between the substrates 2, 3.

A pump-out tube 8 may be hermetically sealed by, for example, solder glass 9 to an aperture/hole 10 that passes from an interior surface of one of the glass substrates 2 to the bottom of a recess 11 in the exterior surface of the glass substrate 2. A vacuum is attached to pump-out tube 8 to evacuate the interior cavity 6 to a low pressure. After evacuation of the cavity 6, the tube 8 is melted to seal the vacuum. Recess 11 retains the sealed pump-out tube 8. Optionally, a chemical getter 12 may be included within a recess 13 that is disposed in an interior face of one of the glass substrates, e.g., glass substrate 2.

VIG units with fused solder glass peripheral edge seals 4 are typically manufactured by depositing glass frit, in a solution, around the periphery of substrate 2. This glass frit ultimately forms the glass solder edge seal 4. A second substrate 3 is brought down on substrate 2 so as to sandwich spacers/pillars 5 and the glass frit solution between the two substrates 2, 3, The entire assembly including the glass substrates 2, 3, the spacers or pillars 5 and the seal material (e.g., glass frit in solution), is then heated to a temperature of at least about 500° C., at which point the glass frit melts, wets the surfaces of the glass substrates 2, 3, and ultimately forms a hermetic peripheral or edge seal 4.

After formation of the edge seal 4, a vacuum is drawn via the pump-out tube 8 to form low pressure space 6 between the substrates 2, 3. The pressure in space 6 may be produced by way of an evacuation process to a level below atmospheric pressure, e.g., below about $10^{-2}$ Torr. To maintain the low pressure in the space or cavity 6, substrates 2, 3 are hermetically sealed. Small high strength spacers or pillars 5 are provided between the substrates to maintain separation of the approximately parallel substrates against atmospheric pressure. Once the space 6 between substrates 2, 3 is evacuated, the pump-out tube 8 may be sealed, for example, by melting using a laser or the like.

The pump-out tube 8 is often located in a corner of one of the substrates, such as, for example, illustrated in FIGS. 1 and 2. The pump-out tube 8 may be made of glass and may protrude above a surface of the glass substrate in which it is located to facilitate pumping and subsequent melting. Because the pump-out tube 8 is typically made of glass and extends above a surface of the substrate it is quite fragile and susceptible to damage. To address this and other fragility problems, protective caps are sometimes placed over the tubes after evacuation and melting. There are a number of protective cap configurations and mounting methods. Some arrangements suffer from drawbacks such as those identified in U.S. patent application Ser. No. 13/246,980 incorporated by reference above.

Additionally, a number of newly developed VIG configurations have been developed. According to some of these configurations, a VIG unit 1, such as, for example, described above with reference to FIGS. 1 and 2, may be provided with an additional laminated sheet or substrate that may be disposed, for example, on or over a substrate that includes a pump-out port. The additional laminated sheet may be adhered to one of the substrates of a conventional VIG unit by means of a laminating adhesive in the form of a laminating film of or including a polymer based adhesive, such as, for example, PVB, or the like.

Additional problems arise with respect to treatment of the pump-out tube in VIG configurations that have an additional substrate laminated thereon. For example, when laminating an additional substrate on a side of the VIG unit where the pump-out port is located, the laminated additional substrate and the laminating film must be provided with a hole to accommodate the protruding pump-out tube. The hole must be of a diameter to provide sufficient clearance about the pump-out tube when the laminated substrate and laminating film are disposed over the substrate of the VIG unit. Due to manufacturing tolerances when creating the hole, as well as the subsequent placement of a protective cap, there is a chance that the holes and the protective cap will not be concentrically or even substantially concentrically aligned. In addition, a glass edge of the access hole formed in the additional laminated substrate could have a rough edge.

Both of these factors, e.g., poor registration of the hole and a possible protective cap, and the rough edge around the access hole in the laminated substrate, contribute to an undesirable aesthetic appearance of the final laminated VIG unit.

One possible solution may be to just place the cap over the hole in the additional laminated substrate after the lamination process that provides the laminated substrate on the underlying VIG unit to form a laminated VIG unit. However, this proposed solution suffers from numerous drawbacks. For example, as noted above, the pump-out tube is fragile, and is exposed during the lamination process, thus making it even more susceptible to damage during the lamination process. Another solution may be to simply place a second cap over the first cap at the conclusion of the lamination process. This solution also suffers from a number of drawbacks including, for example, that the resulting laminated VIG unit will exhibit a significant amount of stack-up height in the area of the stacked protective caps.

According to certain example embodiments disclosed herein, there may be included a process protection ring around the pump-out tube prior to the lamination process. This may be possibly be done in combination with any of the other possibilities discussed above. During the lamination process, the process protection ring provides a barrier that protects the pump-out tube from damage that might occur during the lamination process. For example, if the edge of the hole formed in the laminating film and/or the laminated substrate engages the pump-out tube, such force may break or damage the pump-out tube. In the case where a process protection ring is provided around the exposed portions of the pump-out tube, the forces that would otherwise have impacted the pump-out tube, are absorbed by the process protection ring, thereby mitigating potential damage to the pump-out tube. In this connection the height of the process protection ring may be sufficient to provide protection to the exposed portions of the pump-out tube. According to certain example embodiments, it may be preferable for a height of the process protection ring to be about the same height of the sealed pump-out tube. Alternatively, the process protection ring may have a lower or slightly lower height than the sealed pump-out tube so long as the process protection ring is of sufficient height to provide protection to the pump-out tube. It may also be preferable, according to certain example embodiments, that the height of the process protection ring not be substantially greater than a height of the sealed pump-out tube, so as to avoid additional stack-up height with the finished protective cap.

Additionally, by providing a process protection ring, the need for providing a cap during the lamination process is reduced and could possibly be eliminated in certain example non-limited embodiments. Thus, after the lamination process, a single cap may be disposed over the holes in the laminating film and laminated substrate that were provided to accommodate the protruding pump-out tube. A further advantage of providing a single opaque or substantially opaque protective cap over the pump-out tube, process protection ring and hole(s) in the laminating film and laminated substrate, in certain example embodiments, is that the single outer protective cap covers the holes and exposed edges thereof. and therefore provides a more desirable aesthetic appearance by covering any potential misalignment or non-concentric arrangement of the pump-out tube and hole(s) that may otherwise be visible.

According to further example embodiments, the protective cap may be further provided with at least one positioning ridge disposed about a periphery of the side of the cap that faces the laminated glass substrate, such that the ridge may engage an interior edge of the hole formed in the laminated substrate. This positioning ridge provides additional protective strength for the protective cap and may further reduce the amount of movement of the protection cap once placed over the hole in the laminated substrate. In addition, it may also be advantageous to provide a protective cap having a lower profile than conventional protective caps to improve the aesthetic appearance of the laminated VIG unit.

To provide these and other advantages, there is an example vacuum insulated glass (VIG) assembly, comprising: first and second substantially parallel spaced apart substrates; a peripheral edge seal disposed about a periphery of said first and second spaced apart substrates, the edge seal and first and second substrates defining a cavity therebetween; a pump-out tube extending from an inner surface of said first substrate adjacent said cavity, through said first substrate and extending beyond an outer surface of said first substrate; and a protective ring disposed about a portion of said pump-out tube extending beyond an outer surface of said first substrate.

According to further example embodiments, a laminated vacuum insulated glass assembly is provided, an example laminated vacuum insulated glass assembly, comprising: first and second substantially parallel spaced apart substrates; a peripheral edge seal disposed about a periphery of said first and second spaced apart substrates, the edge seal and first and second substrates defining a cavity therebetween, said cavity being evacuated to a pressure less than atmospheric pressure; a pump-out tube extending from an inner surface of said first substrate adjacent said cavity, through said first substrate and extending beyond an outer surface of said first substrate; a protective ring disposed about a portion of said pump-out tube extending beyond an outer surface of said first substrate; a third substrate laminated over said first substrate, said third substrate including an opening into which a portion of said pump-out tube and said protective ring extend; and a cap disposed over said opening in said third substrate.

Certain example methods for making a vacuum insulated glass assembly according to certain example embodiments are also provided, example methods comprising: providing a first glass substrate; disposing a plurality of spacers on said first substrate; depositing an edge seal material along substantially a periphery of a first surface of said first substrate; providing a second glass substrate over said first glass substrate sandwiching said spacers and edge seal material therebetween; heating said first and second glass substrates and said edge seal material to form a hermetically scaled cavity between said first and second substrates; evacuating said cavity via a pump-out tube provided in one of the first and second glass substrates; sealing said pump-out tube by melting a portion thereof; disposing a protective ring over one of said first and second glass substrates and surrounding a portion of said pump-out tube, said protective ring being adhesively coupled to one of said first and second glass substrates; laminating a third glass substrate over said first or second substrate through which a portion of said pump-out tube extends; and providing a cap over an opening in said third glass substrate in which said protective ring and a portion of said pump-out tube are disposed.

These and other embodiments and advantages are described herein with respect to certain example embodiments and with reference to the following drawings in which like reference numerals refer to like elements, and wherein:

DETAILED DESCRIPTION OF EXAMPLE EMBODIMENTS

Certain example embodiments will be described in detail herein with reference to the foregoing drawings in which like reference numerals refer to like elements. It will be understood that the embodiments described herein are intended to be illustrative, not limiting, and that those skilled in the art will understand that various modifications may be made without departing from the true spirit and full scope of the claims appended hereto.

According to certain example embodiments, a VIG window unit is provided with at least one process protection ring surrounding an exposed portion of a pump-out tube that has been sealed after use in an evacuation process that provides a low pressure (e.g., lower than atmospheric pressure) in a cavity between first and second transparent glass substrates of a VIG window unit. The example process protection ring provides additional protection against potential damage to a pump-out tube (e.g., an exposed portion of a pump-out tube), especially where the VIG unit is subjected to additional manufacturing processes, such as, for example, lamination of an additional glass substrate via a laminating film. The VIG window unit may be provided as a window in building such as residential homes, apartment buildings, and/or commercial office buildings. The VIG window unit may also be used as a window in a building door, freezer door or the like, In certain example embodiments, the VIG window unit has a visible transmission of at least about 30%, more preferably of at least about 40%, even more preferably of at least about 50%, and even more preferably of at least about 60% or 70%.

According to still further example embodiments, a protective cap may be provided over the process protection ring and sealed pump-out tube after lamination of an additional transparent glass substrate. The protective cap may preferably have a low profile to reduce stack-up height and to improve aesthetic appearance of the product, including, for example, and without limitation, covering the hole to thereby hide any unappealing visual artifacts that might occur as a result of misalignment of the holes in the laminated sheet, laminating film and pump-out tube, rough edges of the holes, or the like. Additionally, the protective cap may be provided with a positioning ridge located and sized such that the ridge may engage a hole in the laminated substrate and/or laminating film that was provided to accommodate the pump-out tube and process protection ring, or alternatively to limit the amount of movement of the protective cap once placed over the hole.

Figure 3:
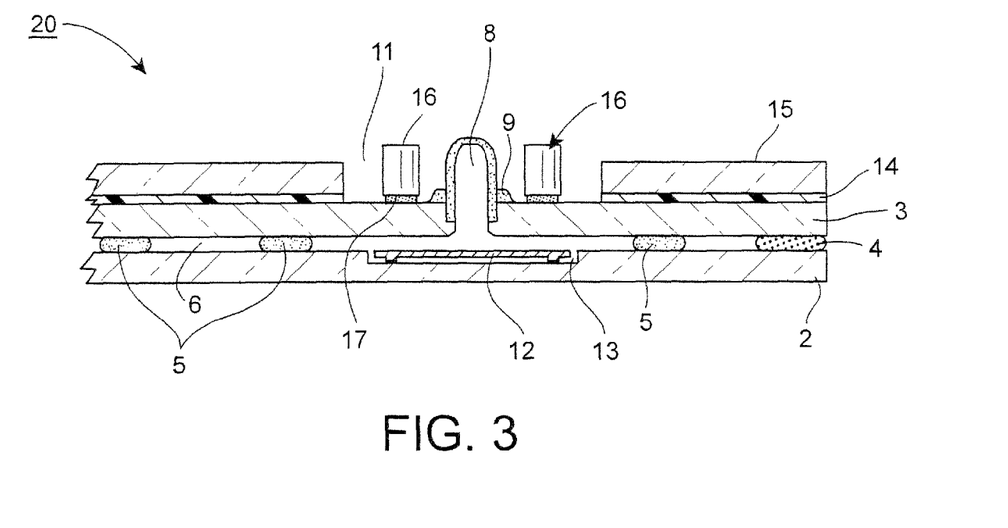
FIG. 3 is a cross sectional schematic diagram of a laminated VIG unit according to an example embodiment.

With reference to FIG. 3, a schematic cross sectional view of a laminated VIG window unit according to an example embodiment is illustrated. The laminated VIG unit 20 includes spaced apart first and second transparent glass substrates 2, 3 that may be interconnected by an edge seal 4, which may, for example, be of or include fused solder glass hermetically sealing edge seal. In certain embodiments, the substrates 2, 3 may be approximately the same size and/or the same size in certain example embodiments. However, in certain other example embodiments, one glass substrate may be larger than the other to provide, for example, an approximately L-shaped step proximate an edge of the VIG unit. Conventional edge seal compositions are known in the art. See, for example, U.S. Pat. Nos. 3,837,866; 4,256,495; 4,743,302; 5,051,381; 5,188,990; 5,336,644; 5,534,469; 7,425,518, and U.S. Publication No. 2005/0233885, the disclosures of which are all hereby incorporated herein by reference. Additional suitable edge seal compositions are disclosed in U.S. patent application Ser. No. 13/354,963, entitled, "Coefficient of Thermal Expansion Filler for Vanadium-Based Frit Materials and/or Methods of Making and/or Using the Same," filed Jan. 20, 2012, the disclosure of which is incorporated by reference herein in its entirety. These edge seal compositions may sometimes be referred to as VBZ (e.g., vanadium, barium, zinc) based compositions. Still further example edge seal materials are disclosed in application Ser. No. 12/929,875, filed Feb. 22, 2011; and/or application Ser. No. 13/238,358, filed Sep. 21, 2011, the entire contents of each of which are incorporated herein by reference. Other frit materials may be used including, for example, Ferro 2824B and 2824G frits. See, for example, application Ser. No. 12/929,874, filed Feb. 22, 2011, the entire contents of which are incorporated herein by reference. Other so-called "lead-free" frits may be used for the seal 4 in different example embodiments.

An array of support pillars/spacers 5 may also be included between the glass substrates 2, 3 to maintain the spacing of the substrates 2 and 3 in view of the lower than atmospheric pressure that is ultimately provided in a cavity 6 between the substrates 2, 3. In certain example embodiments, the spacers may have a height, for example, of from about 0.1 to 1.0 mm, more preferably from about 0.2 to 0.4 mm. The spacers 5 are preferably of a size that is sufficiently small so as to be visibly unobtrusive. According to certain example embodiments, the spacers may be made of or include solder glass, glass, ceramic, metal, polymer, sapphire, or any other suitable material. Additionally, the spacers 5 may be, for example, generally cylindrical, round, spherical, dime-shaped, C-shaped, pillow-shaped and/or any other suitable shape.

A pump-out tube 8, that may be hermetically sealed, for example, of or including solder glass 9 is provided through a hole that passes from an interior surface of one of the glass substrates, e.g., substrate 3 in FIG. 3, and through the glass substrate 3 and extending beyond the outside surface thereof. The pump-out tube 8 (before its tip is sealed/closed) is used in a process to evacuate the cavity 6 between the substrates 2, 3, such as, for example, by attaching a vacuum pump to the pump-out tube 8 and evacuating the cavity 6 to a low pressure, e.g., a pressure lower than atmospheric pressure. After the pumping out process, in a preferred example, a pressure in the cavity 6 is, for example, preferably below about $10^{-2}$ Torr, and more preferably below about $10^{-3}$ Torr, and even more preferably below about $5 \times 10^{-4}$ Torr. In certain example embodiments, the pump-out tube 8, may, for example, have a diameter or distance from about 0.1 to 1.0 mm, more preferably from about 0.3 to 0.7 mm, and even more preferably from about 0.5 mm.

VIG window units using fused solder glass peripheral edge seals 4 may, for example, be manufactured by depositing glass frit, such as, for example, any of those referenced above, in a solution, around the periphery of one of the substrates, e.g., substrate 2. This glass frit ultimately forms the glass solder edge seal 4 after curing. A second substrate, e.g., substrate 3 is brought down on substrate 2 so as to sandwich spacers/pillars 5 and the glass frit solution between the two substrates 2, 3. The entire assembly including the glass substrates 2, 3, the spacers or pillars 5 and the seal material (e.g., glass frit in solution), is then heated to a temperature sufficient for the seal material (e.g., glass frit) to melt and wet the surfaces of the glass substrates 2, 3, and form a hermetic peripheral/edge seal 4. A pump-out tube 8 and vacuum apparatus may then be used to evacuate the cavity 6 formed between the substrates 2, 3 in the example manner described above to provide a low pressure (e.g., lower than atmospheric pressure) between the substrates 2, 3. After the cavity 6 is evacuated to a low pressure, such as, for example, a pressure lower than atmospheric pressure, the top or tip of the glass pump-out tube 8 may then be sealed by melting an exposed portion of the tube using a laser or the like. Sealing the pump-out tube 8 (as illustrated in FIG. 3) maintains the low pressure in the cavity 6. After the tube 8 has been sealed, the central portion of the tube 8 is still in fluid communication with the cavity 6, but the external atmosphere is not because the tip/top of the tube 8 has been sealed shut.

As discussed above, it is sometimes the case that an additional transparent glass substrate 15 may be laminated over or above the substrates 2, 3 that define the cavity 6. In the FIG. 3 embodiment, the third glass substrate 15 may be the same size as substrate 3. In an example preferred embodiment, the additional laminated glass substrate 15 may be adhered to the outer surface of one of the glass substrates, e.g., substrate 3, using a laminating film 14, that may be of, or include, a polymer based adhesive, such as, for example, PVB, or the like. In order to provide an additional laminated glass substrate 15, a hole 11 may be provided in the additional glass substrate 15 and the laminating film 14 to accommodate the exposed portion of the sealed pump-out tube 8 described above. The hole 11 is of a size to provide sufficient clearance about the pump-out tube 8 when the laminated substrate 15 and laminating film 14 are disposed over the substrate 3 of the VIG window unit 20. Due to manufacturing tolerances when creating the hole 11, there is a possibility that the holes in the substrate(s) and the protruding pump-out port 8 will not be concentrically or even substantially concentrically aligned. In addition, a glass edge of the access hole 11 formed in the laminated substrate 15 could have a rough edge. Both of these factors, e.g., poor registration of the holes in substrates 3 and 15 and pump-out port 8, and the rough edge around the access hole 11 in the laminated substrate 15, could contribute to an undesirable aesthetic appearance of the final laminated VIG unit.

To overcome these and other problems, it may be desirable to provide a protective cap 47 over the pump-out tube 8 after the lamination process for providing the additional laminated glass substrate 15, However to do this, as discussed above, the pump-out tube 8 must be exposed to a manufacturing process in which the laminating film 14 and additional laminated glass substrate 15 are placed over the exposed portions of the pump-out tube 8, thereby exposing the pump-out tube 8 to the potential for damage during the lamination process, such as, for example, and without limitation, by contact of the edges of the holes 11 in the laminating film 14 and/or additional laminated substrate 15 with the fragile glass pump-out tube 8. In order to provide protection against breakage or damage to the exposed pump-out tube 8 during the lamination process, according to certain example embodiments, a process protection ring 16 may be provided around the exposed pump-out tube 8 during lamination so as to surround the tube 8 when the unit in FIG. 3 is viewed from above.

According to certain example embodiments, a process protection ring 16 may be adhered to the substrate 3 and surrounding the pump-out tube 8 using, for example, an adhesive tape, such as, for example, 3M VHB adhesive tape, prior to the lamination process that is used to laminate the additional glass substrate 15 to substrate 3. According to a preferred example, the process protection ring 16 may have a height substantially equal to a height of the exposed portion of the pump-out tube 8. According to further example embodiments, the height of the process protection ring may have a height slightly less than that of the exposed portion of the pump-out tube 8, so long as the dimensions of the process protection ring are sufficient to provide adequate protection to the pump-out tube 8. According to still further embodiments, a height of the process protection ring 16 is preferably not higher than a height of the pump-out tube 8 to avoid adding significant stack-up height that may affect the appearance of the laminated VIG unit 20. When viewed from above in the context of FIGS. 3-6, the ring 16 may be circular in shape as shown in FIGS. 4A-4B, or alternatively may be oval shaped, substantially circular shaped, substantially square, and/or substantially rectangular shaped.

Figure 4A:
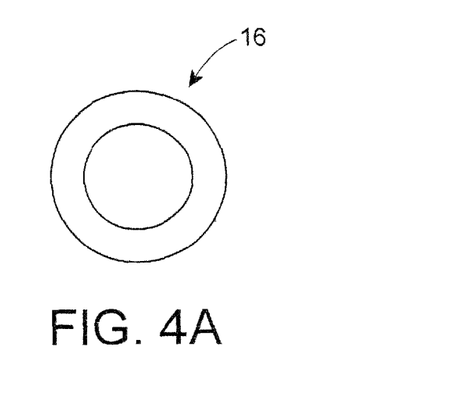
FIG. 4A is a top plan view of a process protection ring according to an example embodiment.
Figure 4B:
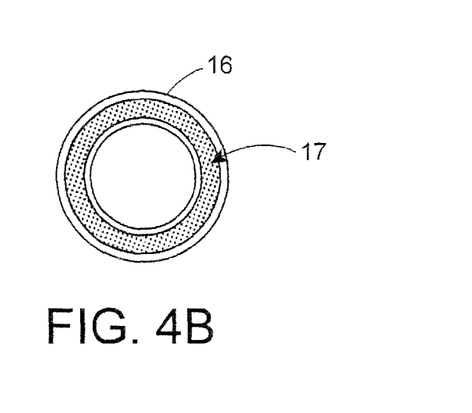
FIG. 4B is a bottom plan view of a process protection ring and adhesive according to an example embodiment.

With reference to FIGS. 4A and 4B, bottom plan views of an example process protection ring 16 are shown. The process protection ring 16, according to certain example embodiments, may be generally circular in cross section and otherwise generally cylindrical. Of course, other suitable geometries may be used so long as adequate protection is provided to the pump-out tube 8 during the lamination process as mentioned above. FIG. 4B is a bottom plan view of an example process protection ring 16 showing an adhesive 17, such as, for example, 3M VHB adhesive tape, or the like, used to adhere the process protection ring 16 to the surface of a substrate, e.g., substrate 3, of the VIG unit 20 prior to the lamination process. As discussed above, according to certain example embodiments, a preferred height of the process protection ring 16 may be set to be less than or substantially equal to a height of the exposed portion of the pump-out tube 8, and should preferably be of sufficient height to provide protection to the exposed portions of the pump-out tube 8 during the lamination process. It is also noted that by providing a process protection ring 16 prior to lamination, the need for providing a cap during the lamination process is avoided in certain example instances. Thus, as discussed below, a single cap may be disposed over the holes 11 in the laminating film 14 and the laminated substrate 15 that were provided to accommodate the protruding portion of the pump-out tube 8.

As discussed above, after the lamination process is completed (i.e., after substrate 15 has been laminated to substrate 3 via polymer based adhesive 14), a protective cap may be provided over the hole(s) 11 as discussed above, to provide further protection by covering the exposed pump-out tube 8, and to provide further aesthetic improvement by covering the holes 11 in the laminating film 14 and the additional laminates substrate 15 that were formed to accommodate the exposed pump-out port 8 during lamination, e.g., by covering any potential misalignment or non-concentric arrangement of the pump-out tube 8 and holes that may otherwise be visible.

Figure 5:
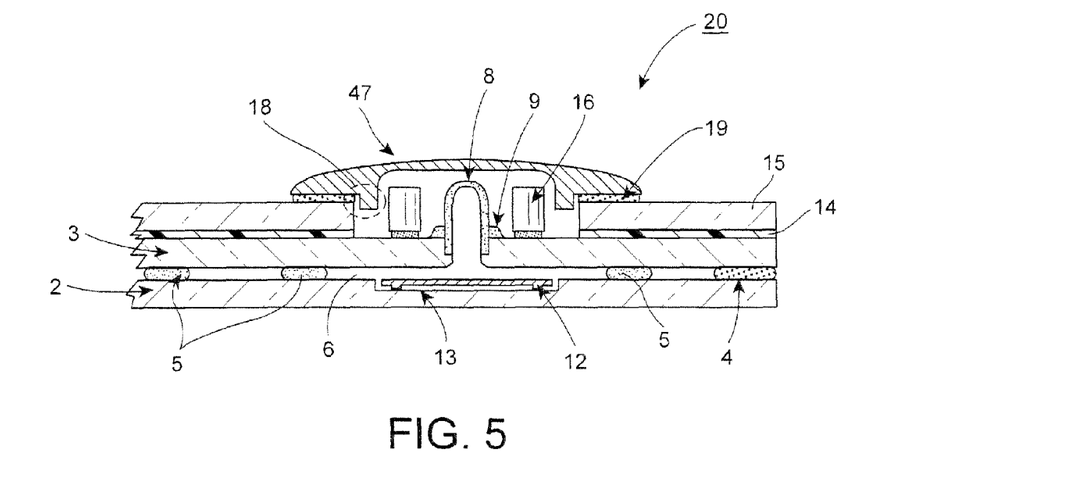
FIG. 5 is a cross sectional schematic diagram of a laminated VIG unit according to an example embodiment including a protective cap.

Turning now to FIG. 5, a laminated VIG window unit 20 including the laminated substrate 15, laminating film 14, process protection ring 16 and protective cap 47 is illustrated in cross section. FIG. 5 is similar to FIG. 3, but includes an illustration of the protective cap 47. The protective cap 47 may be disposed over the holes (see 11 in FIG. 3) that accommodate the exposed portion of the pump-out tube 8 and the process protection ring 16 discussed above. The protective cap 47 may be adhered to the outer surface of the additional laminated glass substrate 15 by way of an adhesive tape 19, such as, for example, 3M VHB adhesive tape, or the like. The size of the protective cap 47 is preferably such that it provides complete coverage of the holes 11 and is of sufficiently low profile to provide further desirable aesthetic appearance of the laminated VIG unit 20. For example, the protective cap 47 includes an inner cavity 21 having a diameter and depth sufficient to accommodate the pump-out tube 8, the process protection ring 16 and to completely cover the hole 11 in the laminated substrate 15. The surface area of the base portion of the cap should be sufficient to accommodate enough adhesive tape to provide a secure connection to the laminated substrate 15.

Figure 6A:
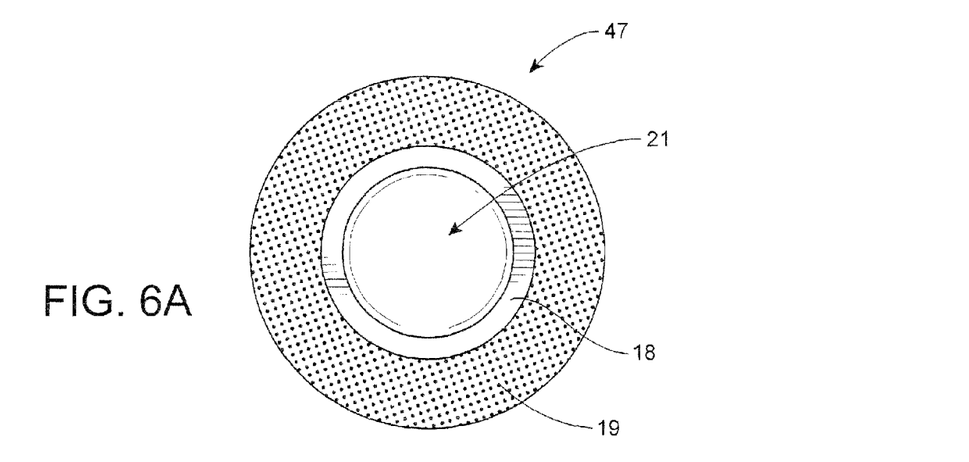
FIG. 6A is a bottom plan view of a protective cap and adhesive according to an example embodiment.
Figure 6B:
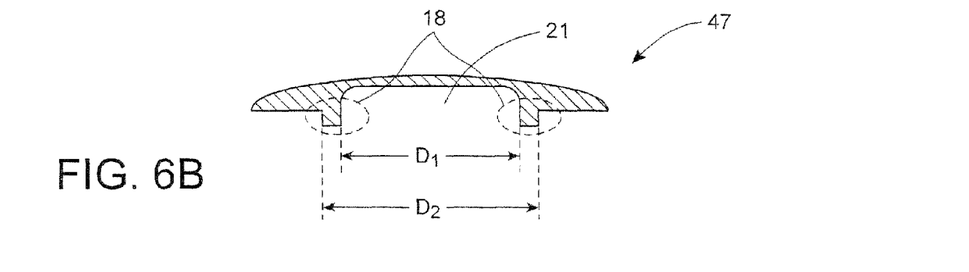
FIG. 6B is a cross sectional schematic view of a protective cap according to an example embodiment.

The protective cap 47 may also optionally be provided with a positioning ridge 18 provided about a periphery of the side of the cap that faces the laminated glass substrate 15 of the generally circular protective cap 47 (e.g., see FIGS. 5-6). The positioning ridge 18 may preferably engage or be located very close to an interior portion of the hole 11 in the laminated substrate 15 to provide additional protective strength for the protective cap, and further reduce the amount of movement of the protection cap once placed over the hole in the laminated substrate 15 (e.g., see FIG. 5).

FIGS. 6A and 6B are a bottom plan view and a cross sectional view, respectively, of example embodiments of the protective cap 47. With reference to FIG. 6A, the protective cap 47 may have a generally circular shape. The positioning ridge 18 generally conforms to this shape and is disposed in a peripheral region of the side of the protective cap 47 that engages the hole in the laminated substrate 15. According to the example embodiment illustrated in FIG. 6A, an adhesive tape 19, such as, for example, 3M VHB adhesive tape, or the like, is shown. Turning to FIG. 6B, a cross section of the protective cap 47 according to an example embodiment is illustrated. As shown in FIG. 6B, an optional positioning ridge 18 may also be provided with the protective cap 47 as described above. According to example preferred embodiments, and outer diameter D2 of the positioning ridge 18 may be such that it engages the hole formed in the laminated substrate 15, or is close to engaging the hole. An inner diameter D1 of the positioning ridge 18 may be such that it is sufficient to accommodate the process protection ring 16 and exposed portion of the pump-out tube 8 in a cavity 21 defined by a top of the protective cap 47 and the positioning ring 18.

While the protective cap 47 is illustrated having a generally circular shape, it will be understood that any suitable shape may be used. In addition, a generally polygonal exterior shape in combination with a generally circular positioning ridge 18 may be used. It will be understood that it is preferable that the positioning ridge 18 be of a shape to adequately engage an inner portion of the hole formed in the additional laminated substrate 15. According to another example, it is not necessary for the positioning ring 18 to be continuous, and it may be provided by a number of protrusions about a periphery of an interior cavity 21 of the protective cap 47, for example. According to certain example embodiments, the protective cap 47 may, for example, be made of or including metal, plastic, silicone, or some other suitable material. Moreover, the coefficients of thermal expansion of the cap 47 and the glass substrates may match one another, for example, within about 25%, more preferably within about 20% and even more preferably in a range of about 10-20%.

Figure 7:
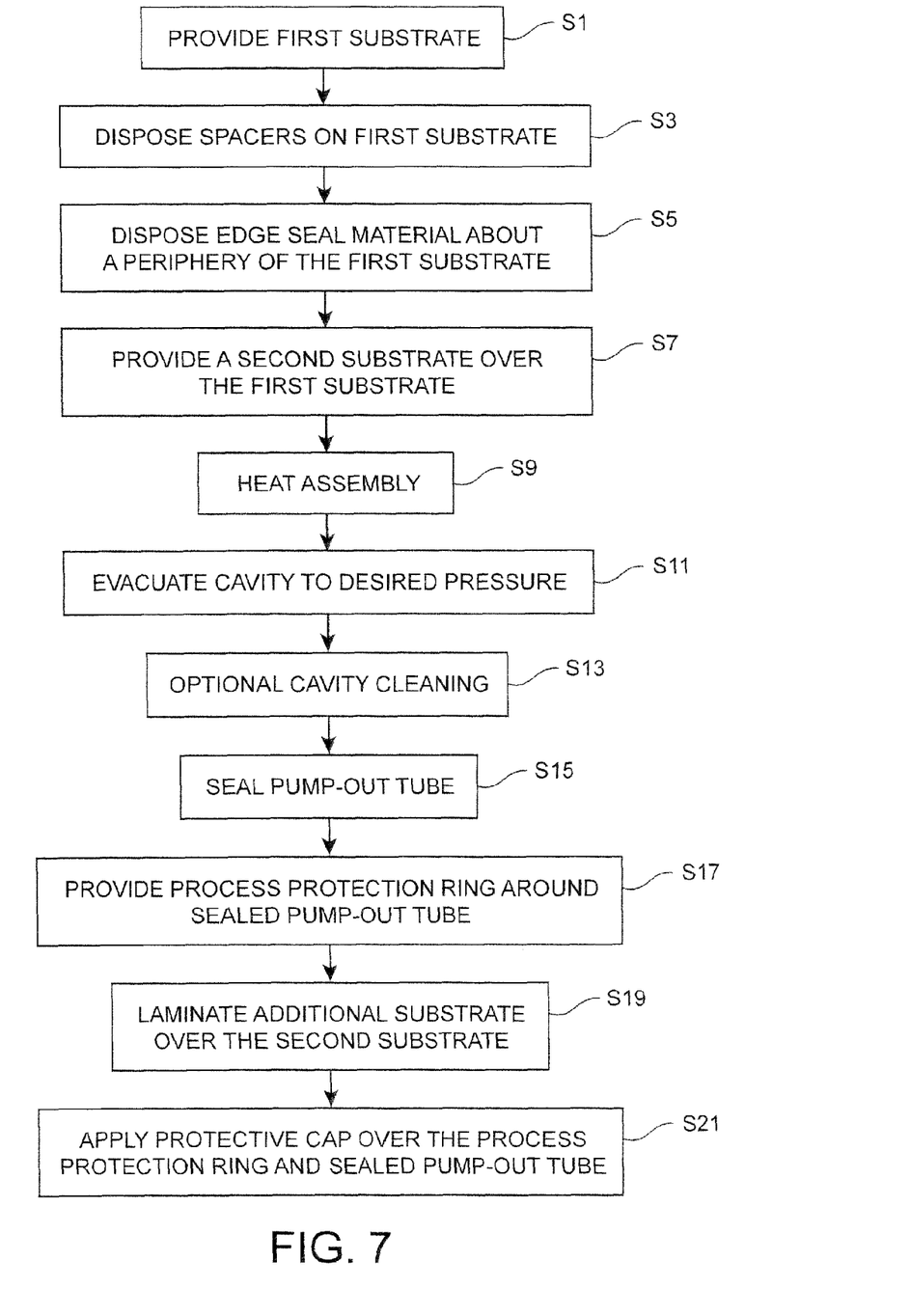
FIG. 7 is a flowchart illustrating a method of making a laminated VIG unit according to an example embodiment.

FIG. 7 is a flowchart illustrating an example method for making a laminated VIG unit according to an example embodiment. A first substrate, such as, for example, a substrate of or including glass is provided in step S1. Spacers or pillars, such as those discussed above, are then provided on a first major surface of the first substrate and located at spaced apart positions sufficient to maintain spacing between the first substrate and a second substrate to be provided 53. In step S5, a frit material, such as. for example, those discussed above that provide the edge seal, is disposed (e.g., printed or otherwise applied) around peripheral edges of the first substrate. A second substrate, such as, for example, a substrate of or including glass, is provided over the first substrate, sandwiching the pillars or spacers and frit material, thereby defining a cavity between the two substrates S7. The subassembly including the first and second substrates, spacers and frit material is then heated at a sufficient level to form a hermetic edge seal S9. The cavity defined between the two substrates is then evacuated to a suitable vacuum level, such as, for example, lower than atmospheric pressure, by, for example, using a pump-out tube S11. The cavity then may optionally be cleaned using a suitable process, such as, for example, plasma cleaning, such as, for example, and without limitation, as disclosed in U.S. Pat. application Ser. No. 13/149, 085, filed May 31, 2011, and U.S. Pat. No. 6,692,600, the entire disclosures of which are incorporated by reference herein in their entireties, S13

The pump-out tube may then be sealed S15 by any suitable means, such as, for example, and without limitation, melting using a laser, exposing the tube to other heat energy, or the like. A process protection tube of the type disclosed and described above may then be disposed about the exposed and sealed pump out tube S17. The process protection tube may be affixed to the second substrate by, for example, and without limitation, an adhesive tape, such as, for example, 3M VHB adhesive tape. In step S19, a laminating film and additional substrate are disposed over the second substrate, and include holes for accommodating the exposed sealed pump-out tube and process protection ring. The laminating film may, for example, be of or include a polymer based adhesive, such as, for example, PVB. It is noted that the laminated VIG unit so formed has a number of substantially aligned holes that accommodate the exposed pump-out tube and surrounding process protection ring. A protective cap 47 may then be provided to cover the holes and the exposed pump-out tube and process protection ring S21. Optionally, a positioning ridge in the protective cap may be arranged to engage an interior surface of a hole in the laminated glass substrate.

In certain embodiments of this invention, there is provided a vacuum insulated window assembly, comprising: first and second substantially parallel spaced apart substantially transparent substrates; a seal disposed at least between said first and second spaced apart substrates, the seal and first and second substrates defining a cavity therebetween with the cavity being at a pressure less than atmospheric; a pump-out tube extending at least partially through an aperture in said first substrate so as to communicate with the cavity and extending beyond an outer surface of said first substrate; and a protective ring disposed proximate an outer surface of the first substrate so as to at least partially surround said pump-out tube of the vacuum insulated window assembly.

In the vacuum insulated window assembly of the immediately preceding paragraph, the window assembly may further comprise a third substrate laminated over at least said first substrate.

In the vacuum insulated window assembly of any of the preceding two paragraphs, there may be a laminating film comprising a polymer disposed between said first substrate and said third substrate for at least laminating the first and second substrates to each other.

In the vacuum insulated window assembly of any of the preceding three paragraphs, there may be a cap disposed over at least said pump-out tube and said protective ring. The cap may be disposed over each of said pump-out tube, said protective ring and an opening formed in said third substrate.

In the vacuum insulated window assembly of any of the preceding four paragraphs, the cap may include a positioning ridge on a side of said cap facing said third substrate. The positioning ridge may engage and/or be located very close to an interior surface of a hole formed in said third substrate.

In the vacuum insulated window assembly of any of the preceding five paragraphs, a height of said protective ring may be less than or substantially equal to a height of a portion of said pump-out tube that extends beyond an outer surface of said first substrate.

In the vacuum insulated window assembly of any of the preceding six paragraphs, an inner diameter of said protective ring may be sufficiently large to accommodate a portion of said pump-out tube that extends beyond an outer surface of said first substrate, possibly without coming into contact with said portion of said pump-out tube that extends beyond an outer surface of said first substrate when said protective ring is disposed over and/or on said first substrate In the vacuum insulated window assembly of any of the preceding seven paragraphs, the pump-out tube may comprise glass.

In the vacuum insulated window assembly of any of the preceding eight paragraphs, said protective ring may be secured to an outer surface of said first substrate by an adhesive tape.

In the vacuum insulated window assembly of any of the preceding nine paragraphs, said first and second substrates may be glass substrates.

In the vacuum insulated window assembly of any of the preceding ten paragraphs, a portion of the pump-out tube extending beyond the outer surface of the first substrate may be sealed.

In the vacuum insulated window assembly of any of the preceding eleven paragraphs, a plurality of spacers may be disposed in said cavity between said first and second substrates.

In the vacuum insulated window assembly of any of the preceding twelve paragraphs, the seal may be an edge seal.

In the vacuum insulated window assembly of any of the preceding thirteen paragraphs, the seal may comprise glass frit.

In the vacuum insulated window assembly of any of the preceding fourteen paragraphs, said protective ring may have a generally cylindrical shape.

in the vacuum insulated window assembly of any of the preceding fifteen paragraphs, said seal may comprise vanadium and/or solder glass.

While certain example embodiments have been described and disclosed herein, it will be understood that the embodiments described herein are intended to be illustrative, not limiting, and that those skilled in the art will understand that various modifications may be made without departing from the true spirit and full scope of the claims appended hereto.

What is claimed is:

1. A vacuum insulated window assembly, comprising:
   first and second substantially parallel spaced apart substantially transparent substrates;
   a seal disposed at least between said first and second spaced apart substrates, the seal and first and second substrates defining a cavity therebetween with the cavity being at a pressure less than atmospheric pressure;
   a pump-out tube extending at least partially through an aperture in said first substrate so as to communicate with the cavity and extending beyond an outer surface of said first substrate;
   a protective ring disposed proximate an outer surface of the first substrate so as to at least partially surround said pump-out tube of the vacuum insulated window assembly;
   wherein the protective ring is spaced apart from the pump-out tube so that the protective ring does not contact the pump-out tube;
   wherein the protective ring does not extend laterally beyond a periphery of the first substrate and has a height that is: (i) no greater than a height of the pump-out tube, relative to the outer surface of the first substrate, and (ii) greater than a height of sealant at a periphery of the pump-out tube that bonds the pump-out tube to the first substrate; and
   a cap disposed over said pump-out tube and said protective ring, wherein the protective ring is configured so that it does not support the cap.

2. The vacuum insulated window assembly of claim 1, further comprising a third substrate laminated over said first substrate.

3. The vacuum insulated window assembly of claim 2, further comprising a laminating film comprising a polymer disposed between said first substrate and said third substrate for at least laminating the first and second substrates to each other.

4. The vacuum insulated window assembly of claim 2, wherein the cap is disposed over each of said pump-out tube, said protective ring and an opening formed in said third substrate.

5. The vacuum insulated window assembly of claim 4, wherein said cap includes a positioning ridge on a side of said cap facing said third substrate.

6. The vacuum insulated window assembly of claim 5, wherein said positioning ridge engages or is located very close to an interior surface of a hole formed in said third substrate.

7. The vacuum insulated window assembly of claim 1, wherein an inner diameter of said protective ring is sufficiently large to accommodate a portion of said pump-out tube that extends beyond an outer surface of said first substrate without coming into contact with said portion of said pump-out tube that extends beyond an outer surface of said first substrate when said protective ring is disposed over and/or on said first substrate.

8. The vacuum insulated window assembly of claim 1, wherein said pump-out tube comprises glass.

9. The vacuum insulated window assembly of claim 1, wherein said protective ring is secured to an outer surface of said first substrate by an adhesive tape.

10. The vacuum insulated window assembly of claim 2, wherein said cap is secured to an outer surface of said third substrate by an adhesive.

11. The vacuum insulated window assembly of claim 1, wherein said first and second substrates are glass substrates.

12. The vacuum insulated window assembly of claim 1, further comprising a plurality of spacers disposed in said cavity between said first and second substrates.

13. The vacuum insulated window assembly of claim 1, wherein said seal is an edge seal.

14. The vacuum insulated window assembly of claim 1, wherein said seal comprises glass frit.

15. The vacuum insulated window assembly of claim 1, wherein said protective ring has a generally cylindrical shape.

16. The vacuum insulated window assembly of claim 1, wherein said seal comprises vanadium and/or solder glass.

17. The vacuum insulated window assembly of claim 2, wherein said first, second and third substrates comprise glass.

18. A laminated vacuum insulated glass assembly, comprising:
    first and second substantially parallel spaced apart glass substrates;
    a peripheral edge seal disposed about a periphery of said first and second spaced apart substrates, the edge seal and first and second substrates defining a cavity therebetween, said cavity at a pressure less than atmospheric pressure;
    a pump-out tube extending from said first substrate, through at least part of said first substrate and extending beyond an outer surface of said first substrate;
    a protective ring disposed about a portion of said pump-out tube;
    a third substrate laminated over said first substrate, said third substrate including an opening in which said pump-out tube and said protective ring are located;
    a cap over said opening in said third substrate, wherein the cap extends laterally beyond the protective ring and no structure is located directly between the cap and the protective ring;
    wherein the protective ring is spaced apart from the pump-out tube so that the protective ring does not contact the pump-out tube, and wherein the protective ring is configured so that it does not support the cap; and
    wherein the protective ring does not extend laterally beyond a periphery of the first substrate and has a height that is (i) no greater than a height of the pump-out tube, relative to the outer surface of the first substrate, and (ii) greater than a height of sealant at a periphery of the pump-out tube that bonds the pump-out tube to the first substrate.

19. The vacuum insulated glass assembly of claim 18, further comprising a laminating film disposed between said first substrate and said third substrate.

20. The vacuum insulated glass assembly of claim 18, wherein said cap includes a positioning ridge disposed about a periphery of said cap on a side of said cap facing said third substrate.

21. The vacuum insulated glass assembly of claim 18, wherein said positioning ridge engages an interior surface of a hole formed in said third substrate.

22. The vacuum insulated glass assembly of claim 18, wherein said seal comprises one or more of vanadium, barium and zinc.

23. The vacuum insulated window assembly of claim 1, wherein said protective ring has a substantially rectangular shape.

24. The vacuum insulated window assembly of claim 1, wherein the cap extends laterally beyond the protective ring and no structure is located directly between the cap and the protective ring.

25. The vacuum insulated window assembly of claim 1, wherein said sealant at the periphery of the pump-out tube that bonds the pump-out tube to the first substrate comprises solder glass.

26. The vacuum insulated window assembly of claim 18, wherein said sealant at the periphery of the pump-out tube that bonds the pump-out tube to the first substrate comprises solder glass.

27. The vacuum insulated window assembly of claim 1, wherein the protective ring is adhered directly to the first substrate via adhesive, wherein said adhesive does not contact the pump-out tube.

28. The vacuum insulated glass assembly of claim 18, wherein the protective ring is adhered directly to the first substrate via adhesive, wherein said adhesive does not contact the pump-out tube.

\* \* \* \* \*